United States Patent Office
3,440,393
Patented Apr. 22, 1969

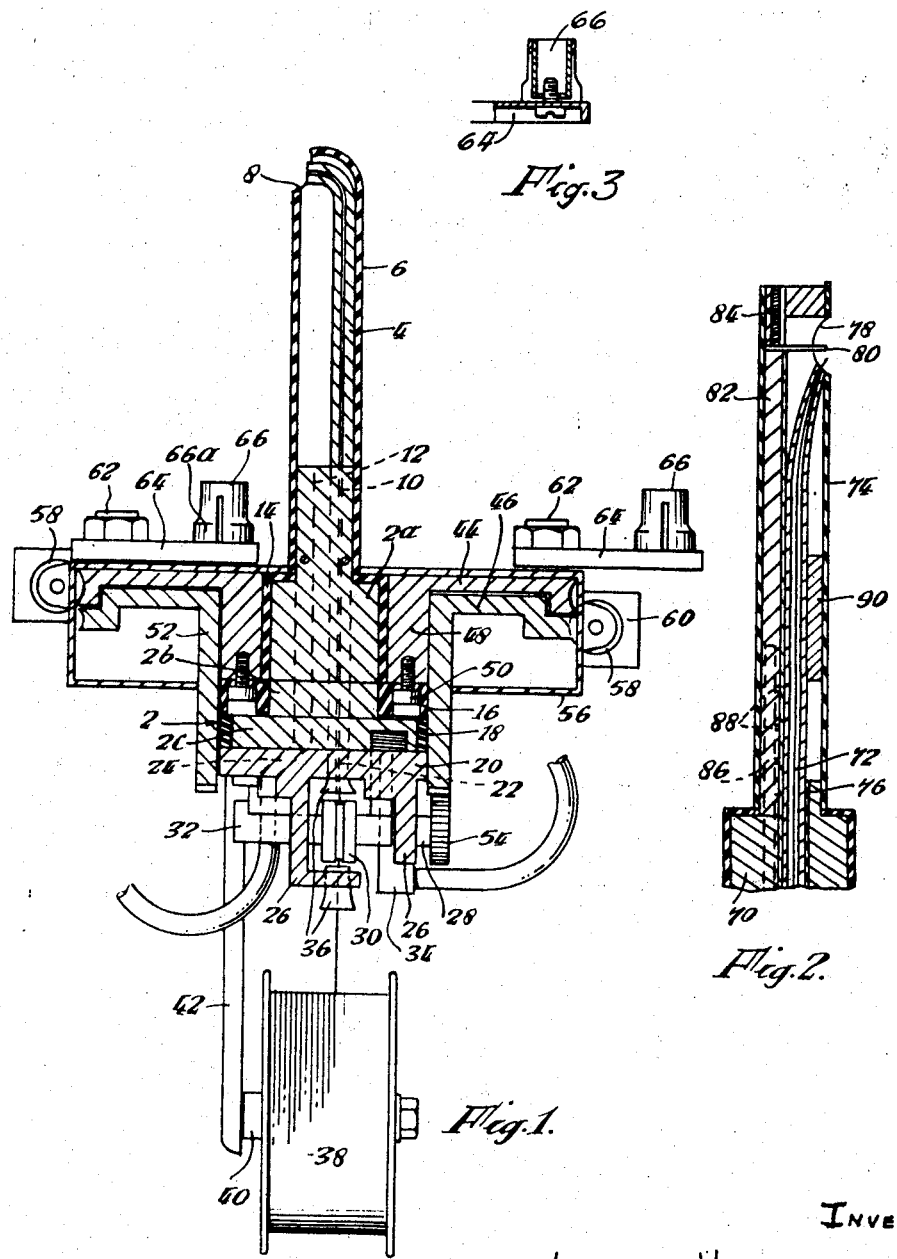

3,440,393
INTERNAL TUBE ARC WELDER
Leslie Henderson, Whitley Bay, Northumberland, and Leslie Hasson, Wrekenton, Gateshead, England, assignors to Clarke, Chapman & Co. Limited, Gateshead, England, a company of Great Britain and Northern Ireland
Filed Nov. 14, 1966, Ser. No. 594,136
Claims priority, application Great Britain, Nov. 15, 1965, 48,464/65
Int. Cl. B23k 9/12
U.S. Cl. 219—125
9 Claims

ABSTRACT OF THE DISCLOSURE

An apparatus that can be used for the internal welding of tubes to a tube place by such processes as M.I.G. or T.I.G. welding is constructed wherein in the apparatus, the welding head comprises a hollow guide that can be aligned with the tube and that is carried by a first drive ring that also carries welding wire feed means. A second drive ring coaxial with the first ring has drive means connected to the wire feed means and rotation of the two drive rings at different speed operates the feed means through the agency of said drive means.

---

This invention relates to welding apparatus for use in welding tubes to tube plates. In welding operations of this type it has been found that a better weld can be produced if this is formed internally of the tube rather than externally thereof, and the object of the present invention is to provide a relatively compact apparatus for effecting such internal welding, preferably by the "M.I.G." process wherein droplets of welding metal are thrown by a pulsating welding current from the welding head on to the materials to be welded.

According to the invention welding apparatus for use in welding tubes internally to tube plates includes a welding head comprising a hollow guide for a welding wire and arranged to be aligned internally in a tube to be welded to extend therealong, said guide being connected to a first drive ring to rotate the guide about the tube axis, the apparatus further including welding wire feed means and a second drive ring being connected to said feed means to operate said means. Conveniently, the wire feed means is mounted on the welding head to rotate therewith and said drive rings are arranged to be rotatable at different angular speeds.

Thus, when such an arrangement includes a drive connection between the second ring and feed rollers mounted on the welding head, when the two drive rings are driven at the same angular velocity no rotation is transmitted to the feed rollers so that no wire feed occurs. If the angular velocity of the second drive ring is greater than that of the first drive ring then a feed roller is driven through the transmission from the second drive ring and can thus feed welding wire at the required rate through the bore and tube towards the workpiece.

The welding head may have an electrically conductive body wholly enclosed within an insulating sheath. The guide projects from one end of the body and may lie within a heat-resistant insulating sheath and be curved at its end remote from the body to project transversely towards an opening in the sheath wall. The apparatus can readily be used for "M.I.G." or "T.I.G." welding by feeding gas through the sheath, the gas supply connection conveniently being made by a bore in the welding head body. The other end of the welding head body may carry bearing supports for the wire feed rollers to urge the welding wire through the guide, at least one of the rollers being drivingly connected to said second ring.

Preferably the two drive rings are of the same diameter and are positioned co-axially, adjacent the first end of the body, the second drive ring being provided with a sleeve extending axially towards the wire feed rollers at the other end of the body and the part in driving engagement with the transmission to the wire feed rollers being the annular end surface of this sleeve. Preferably this annular end surface is toothed and meshes with a pinion formed on a shaft carrying one of the wire feed rollers and mounted in bearing supports on the body. Each drive ring is preferably formed with teeth meshing with respective drive input means, although friction, belt or chain drive to the drive rings are possible alternatives.

The invention will be more particularly described with reference to the accompanying drawings wherein:

FIG. 1 is a longitudinal sectional view of a first form of the apparatus according to the invention;

FIG. 2 is a similar section showing the forward end or guide of a modified form of apparatus according to the invention; and FIG. 3 is a sectional view of arm 64 and locating member 66.

Referring to FIG. 1, the apparatus comprises a welding head having a body 2 of circular cross-section. This includes a front part 2a of stepped diameters, its leading end having the smaller diameter, an intermediate disc 2b equal in diameter to the rear portion of the front part, and a larger diameter rear disc 2c. The three parts are of a metal such as mallory or aluminium bronze and are secured together in electrically conducting relationship by bolts or screws (not shown).

Secured to the body at the forward end thereof is a guide tube 4 also of metal and extending parallel to, but offset from, the central axis of the body. The guide tube extends within a heat-resistant insulating sheath 6, preferably of fused alumina, the sheath being coaxial with the body and surrounding and being secured to the front part 2a of the body. The forward end of the guide tube remote from the body is curved through 90° to project radially towards an opening 8 in the sheath wall at the end of the sheath. Two axially extending bores 10, 12 are formed through the body, the bore 10 being coaxial with the guide tube 4 and the bore 12 opening into the sheath at the front end of the body.

Surrounding the larger diameter section of the front part 2a of the body is a sleeve 14 of insulating material, the sleeve projecting radially inwardly at the juncture of the different diameter parts to contact the sheath 6 so that no conducting part is left exposed. The rear end of the sleeve 14 axially abuts an annulus 16 of insulating material fitting closely round the intermediate disc 2b of the body and of the same axial thickness as this disc. The outer diameter of the annulus 16 is equal to the outer diameter of a sheath 18 of insulating material surrounding the rear disc 2c of the body. The rear disc 2c abuts the annulus 16 with its front axial face, and has secured to it to its rear axial face a circular plate 20 of insulating material having bores 22, 24 aligned with the bores 10, 12 respectively, of the body. The whole of the conductive body 2 is thus totally enclosed by insulating material.

Secured to the rear or outer face of the insulating plate 20, are two axially extending arms 26 having bearings to receive two parallel shafts 28 (only one of which can be seen in FIG. 1) extending transversely to the axis of the apparatus, each shaft carrying a wire feed roller 30. Also secured to the outer face of the insulating plate is a connector 32 for a gas supply line, the connector leading into the bore 24 through the plate connecting with the bore 12. The wire feed path defined by the rollers 30 is axially aligned with the first bore 10 through the body and the insulating plate 20 carries a flared guide nozzle 36 leading into the first bore 22 through the plate while one of the arms 26 has a further guide nozzle 36 in advance of the rollers 30 and flared away therefrom to guide the wire into the rollers. A reel 38 of welding wire is rotatably supported on a shaft 40 secured to the apparatus by an arm 42 extending axially therefrom and secured to the outer side of the insulating plate 20. A connector 34 for an electrical supply line is also secured to the outer face of the plate, the connector extending through the plate to screw into the rear disc 2c of the body and also being enclosed by insulating material.

Coaxial with and surrounding the body are two drive rings 44, 46, the rings being of the same diameter and axially spaced apart by a small distance. The first ring 44 has an axially extending sleeve 48 fitting over the insulating sleeve round the larger diameter section of the front part of the body, and the insulating annulus 16 is screwed to the axial end face of this sleeve by a number of screws 50, the screw-receiving holes in the annulus being countersunk so that the screws have no contact with the rear disc 2c of the conducting body. This first drive ring is thus secured to the body, so that on rotation of the ring, the body and all the equipment carried thereby also rotates. The second drive ring 46 is on the rear side of the first drive ring 44 and has an axial sleeve 52 extending to a position just short of the shafts 28 carrying the welding rollers 30. The axial end face of this sleeve is formed with gear teeth and meshes with a pinion 54 secured to one of the shafts 28.

The two drive rings are enclosed in a housing 56 which carries two worm wheels 58, each worm wheel meshing with toothed peripheries of respective ones of the drive rings. Separate drive transmissions 60 are provided for each worm wheel, at least one of the transmissions being capable of speed variation.

On the forward face of the housing 56 are positioned two stub shafts 62 on each of which is pivoted an arm 64 carrying at its other end a forwardly projecting locating member 66. Each locating member is detachably secured to its associated arm, and the outer diameter of the locating members is selected to be substantially the same as the internal diameter of the tubes being welded to the tube plate.

When the apparatus is to be used, the sheath 6 is inserted through the hole in the tube plate to the junction of the plate with the tube to be welded and the locating members 66 are inserted into two other holes in the tube plate. The length of the locating members is selected according to the thickness of the tube plate so that when the locating members are inserted in the tube plate holes to a point where an enlarged stop section 66a prevents further insertion, the tip of the guide tube 4, i.e., the welding nozzle, lies opposite the line where the tube joins the tube plate. The locating members thus serve the dual purpose of controlling the axial penetration of the welding nozzle and of holding the apparatus in position on the tube plate during welding.

With the nozzle in place within the tube the welding current is switched on and the gas supply started.

Since the drive ring 44 carries the drive ring 46, if the two rings are rotated together at the same angular velocity there is no relative angular movement between the pinion 54 and the teeth on the sleeve 52 of the second drive ring 46 so that the driven wire feed roller does not rotate. There is thus no wire feed but the welding nozzle rotates within the tube. When, however, there is relative rotation between the two drive rings 44, 46 then the pinion 54 is rotated so that wire feed occurs, the wire being fed from the reel 38 through the guides 34, 36 into the first bore 10 and from there through the guide tube 4 to emerge from the guide tube through the opening 8 in the sheath wall and thus to impinge on the joining line of the tube and tube plate. Gas is fed through the second bore 12 in the body into the sheath 6 and the welding metal is thus surrounded by a gas flow during the welding process. The current supply to the conducting body 2 is applied to the welding wire by the contact of this wire with the walls of the first bore 10 and the guide tube 4, and if "M.I.G." welding is to be performed this current is pulsated in known manner so that globules of wire are thrown on the surface of the tube to be welded. A clean, firm weld can rapidly be effected with this apparatus.

FIG. 2 shows the forward end of a welding apparatus according to the invention similar in many respects to that already described but which is adapted for "T.I.G." welding. Thus, the general form and manner of location of welding body 70 of the modified apparatus, the mounting of a wire reel thereon and the drive means for rotating the body and feeding wire from the reel are the same and require no further illustration.

At the forward end of the body 70, however, guide tube 72 for the welding wire is located co-axially both of the body 70 and of insulating sheath 74 and is now electrically isolated from the conducting body 70 by an outer sleeve 76 of ceramic insulation. At the forward extremity of the sheath is an opening 78 towards which the guide tube 72 is curved and a tungsten electrode 80 projects into this opening from the opposite side of the sheath. The electrode is secured to a conducting rod 82 by a lock screw 84, the rod being in electrical contact with the body. At its rear region the rod 82 has an axial bore 86 communicating with the gas passage 12 in the body and transverse apertures 88 allow the gas to flow from the bore through the sheath to the opening 78. A support 90 is provided for the guide tube intermediate the length of the sheath.

In use, the apparatus is placed in position and set into operation in the same manner as the first-described example, the only difference being the particular welding process employed.

What we claim and desire to secure by Letters Patent is:

1. Apparatus for welding tubes internally to a tube plate, said apparatus comprising, in combination, a housing, first and second drive rings mounted to said housing and being independently rotatable about a common axis, a welding head connected to the first drive ring, said head including a hollow guide to be directed to the welding point of the tube, said guide extending from the first drive ring parallel to its axis of rotation, welding wire feed means arranged rearwardly of the inlet to said hollow guide and attached to the welding head to rotate with the first drive ring, input drive means being operatively engageable with the two drive rings to rotate the respective rings at different angular speeds, drive means operatively connecting said second drive ring to said feed means to progress welding wire through the hollow guide by rotation of the second drive ring relative to the first drive ring.

2. Apparatus according to claim 1 wherein the welding head further comprises an electrically conductive body portion from one end of which the guide projects, an external sheath that is heat resistant and electrically insulating being provided on the body and the guide.

3. Apparatus according to claim 2 wherein said feed means comprises a pair of rollers, a mounting attaching said rollers to the welding head body whereby said mounting rotates with the first drive ring, the rollers being rotatable on the mounting by the drive means from said second ring, speed control means being provided to rotate the two drive rings at different angular speeds to progress the welding wire.

4. Apparatus according to claim 3 wherein an annular end surface of the second ring forms transmission means for the drive therefrom, a wheel being located in driven engagement with said surface, a shaft having said wheel and one of said feed rollers secured to it, said shaft being supported in said mounting.

5. Apparatus according to claim 3 having a mounting for a welding wire drum secured to and projecting rearwardly from the welding head.

6. Apparatus according to claim 2 wherein means are provided for feeding a protective gas flow through the guide to the point of welding, said means including a bore in the welding head body and an outer sheath coextending with and surrounding the hollow guide, said bore being in communication with the sheath interior.

7. Apparatus according to claim 1 wherein said hollow guide comprises a main wire feed portion offset to one side of the axis of rotation of the drive rings, an exit aperture for the welding wire being provided in the forward end of the guide, said aperture opening to the side of said main portion nearest the axis of the drive rings.

8. Apparatus according to claim 1 further comprising a plurality of plug-form locating members and arranged to seat in respective tubes adjacent to the tube that is to be welded, arms attaching the respective members to the housing being independently pivotable on the housing on axis parallel to the drive rings common axis to vary the locations of the members transverse to said common axis.

9. Apparatus according to claim 7 wherein an outer insulating sheath is provided on the guide and forms a conduit for protective gas to the point of welding, said main wire feed portion being offset to one side of the sheath interior.

References Cited

UNITED STATES PATENTS

| | | | |
|---|---|---|---|
| 2,818,493 | 12/1957 | Pilia et al. | 219—125 |
| 2,868,953 | 1/1959 | Gardner | 219—125 |
| 2,930,883 | 3/1960 | Adamec et al. | 219—125 |
| 3,114,830 | 12/1963 | Wotitzky et al. | 219—125 |
| 3,345,494 | 10/1967 | Apblett et al. | 219—125 |
| 3,350,537 | 10/1967 | Lawrence et al. | 219—125 |

RICHARD M. WOOD, *Primary Examiner.*

L. A. SCHUTZMAN, *Assistant Examiner.*

U.S. Cl. X.R.

219—60